(12) United States Patent
Brooks

(10) Patent No.: US 9,187,032 B2
(45) Date of Patent: Nov. 17, 2015

(54) EXCLUSIVE OR (XOR) LAMP DRIVER AND LAMP

(71) Applicant: Grote Industries, Inc., Madison, IN (US)

(72) Inventor: Timothy W. Brooks, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 420 days.

(21) Appl. No.: 13/837,876

(22) Filed: Mar. 15, 2013

(65) Prior Publication Data

US 2013/0200792 A1 Aug. 8, 2013

Related U.S. Application Data

(63) Continuation-in-part of application No. 13/331,277, filed on Dec. 20, 2011, now Pat. No. 8,912,721, and a continuation-in-part of application No. 13/331,146, filed on Dec. 20, 2011, now Pat. No. 8,740,628.

(60) Provisional application No. 61/424,857, filed on Dec. 20, 2010, provisional application No. 61/424,948, filed on Dec. 20, 2010.

(51) Int. Cl.
*B60Q 1/14* (2006.01)
*B60Q 1/34* (2006.01)
*B60Q 1/30* (2006.01)
*B60Q 1/32* (2006.01)

(52) U.S. Cl.
CPC *B60Q 1/34* (2013.01); *B60Q 1/305* (2013.01); *B60Q 1/32* (2013.01)

(58) Field of Classification Search
CPC .................................. B60Q 1/00; H05B 37/02
USPC .................................................. 315/76–80, 82
See application file for complete search history.

(56) References Cited

U.S. PATENT DOCUMENTS

| 4,241,371 A | 12/1980 | Sage |
| 5,030,938 A | 7/1991 | Bondzeit |
| 5,521,466 A * | 5/1996 | Vincent ........................... 315/77 |
| 7,893,622 B2 | 2/2011 | Chang |
| 2010/0308984 A1 | 12/2010 | Ehrlich |
| 2011/0237090 A1 | 9/2011 | Ehrlich |

OTHER PUBLICATIONS

Lawrence, Mark; Motorcycle Lights [online], Feb. 25, 2004; Retrieved From Internet Archive, http://web.archive.org/web/20040225084649/http://motorcycleinfo.calsci.com/Lights/html.

(Continued)

*Primary Examiner* — Minh D A
(74) *Attorney, Agent, or Firm* — Woodard Emhardt Moriarty McNett & Henry LLP

(57) ABSTRACT

A lamp and lamp driver are disclosed, in which single intensity marker lamps that are desired to be flashed can be connected to a lamp driver employing an exclusive OR (XOR) logic circuit. In one application, this lamp driver is coupled to a vehicle turn function wire and marker function wire, and a plurality of marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash. Other embodiments are disclosed.

28 Claims, 6 Drawing Sheets

(56) References Cited

OTHER PUBLICATIONS

Radiantz, Inc.; Dual Element Circuit for Flex 5-10 LEDs [online], Dec. 15, 2005; Retrieved From Internet Archive http://web.archive.org/web/20051211211811/http://www.radiantz.com/index.html?626.html&1.

Thorstensen,Eric; Auxilliary High Mount Stop and Turn Lights; May 1, 2008; Alamo City, Nevada.

* cited by examiner

US 9,187,032 B2

EXCLUSIVE OR (XOR) LAMP DRIVER AND LAMP

CROSS-REFERENCE TO RELATED APPLICATIONS

This application is a continuation-in-part of U.S. application Ser. No. 13/331,277, filed Dec. 20, 2011, which claims the benefit of U.S. application Ser. No. 61/424,857, filed Dec. 20, 2010, both of which are hereby incorporated by reference in their entirety. This application is also a continuation-in-part of U.S. application Ser. No. 13/331,146 filed Dec. 20, 2011, which claims the benefit of U.S. application Ser. No. 61/424,948 filed Dec. 20, 2010, both of which are incorporated by reference in their entirety.

TECHNICAL FIELD OF THE DISCLOSURE

The present disclosure generally relates to drivers for lamps and, more particularly, to a driver for a vehicular lamp.

BACKGROUND OF THE DISCLOSURE

Although the presently disclosed embodiments will find application in a wide variety of lamp applications, it is instructive to review the trailer marker lamp application. Trailer manufacturers have designed rows of marker lamps located on trailers, such as commercial semi trailers to name just one non-limiting example, for appearance. In some cases, trailer manufacturers wish to flash one or more of these marker lamps when the vehicle operator activates the turn or hazard function flashes. To enable this, dual intensity marker lamps have been developed. The low intensity (or minor) function meets the marker lamp photometric requirements, and the high intensity (or major) function is brighter. Alternating activation of the low and high intensity functions causes the marker lamp to exhibit a flashing appearance.

These dual intensity marker lamps are more expensive to manufacture, require a second part number for the customer (i.e. a part number that is different than that used for the single intensity marker lamp), and have three terminals or wires in the lamp (minor, major and ground). Typically, the design goal for such dual intensity marker lamps is as much intensity difference between the minor and major function as possible, which results in a lower intensity minor function—or a dimmer marker than a standard single intensity marker lamp. Some trailer designers have placed an entire row of marker lamps along the side of a trailer. Using a dual intensity marker lamp in such a row of single intensity marker lamps results in one lamp that does not exactly match the others in intensity, even when all are being operated with the lower intensity minor function. This results in a non-uniform, undesirable appearance.

Trailer manufacturers and designers would prefer a flashing solution that uses standard single intensity marker lamps. These single intensity marker lamps have two terminals or wires in the lamp, namely power and ground.

SUMMARY OF THE DISCLOSURE

In some of the presently disclosed embodiments, single intensity marker lamps that the trailer designer wishes to flash can be connected to a lamp driver employing an exclusive OR (XOR) circuit as disclosed herein. Using this driver, all of the marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash.

By using the presently disclosed lamp driver embodiments, trailer manufacturers can use standard single intensity marker lamps in auxiliary lamp locations and combine the flash and marker functions in one lamp, increasing conspicuity and lowering their overall costs.

In one embodiment, a lamp driver is disclosed, comprising: a logic circuit operative to implement an exclusive OR (XOR) logic function between its inputs and its output, the logic circuit comprising: a marker function input operatively coupled to a marker function wire of a vehicle; a turn function input operatively coupled to a turn function wire of said vehicle; and a lamp driver output.

In another embodiment, a lamp is disclosed, comprising: a logic circuit operative to implement an exclusive OR (XOR) logic function between its inputs and its output, the logic circuit comprising: a marker function input operative to receive a marker function signal from a vehicle; a turn function input operative to receive a turn function signal from said vehicle; and a lamp driver output; and a lamp having a lamp power input operatively coupled to said lamp driver output.

Other embodiments are also disclosed.

DETAILED DESCRIPTION OF THE VARIOUS EMBODIMENTS

Figure 1:
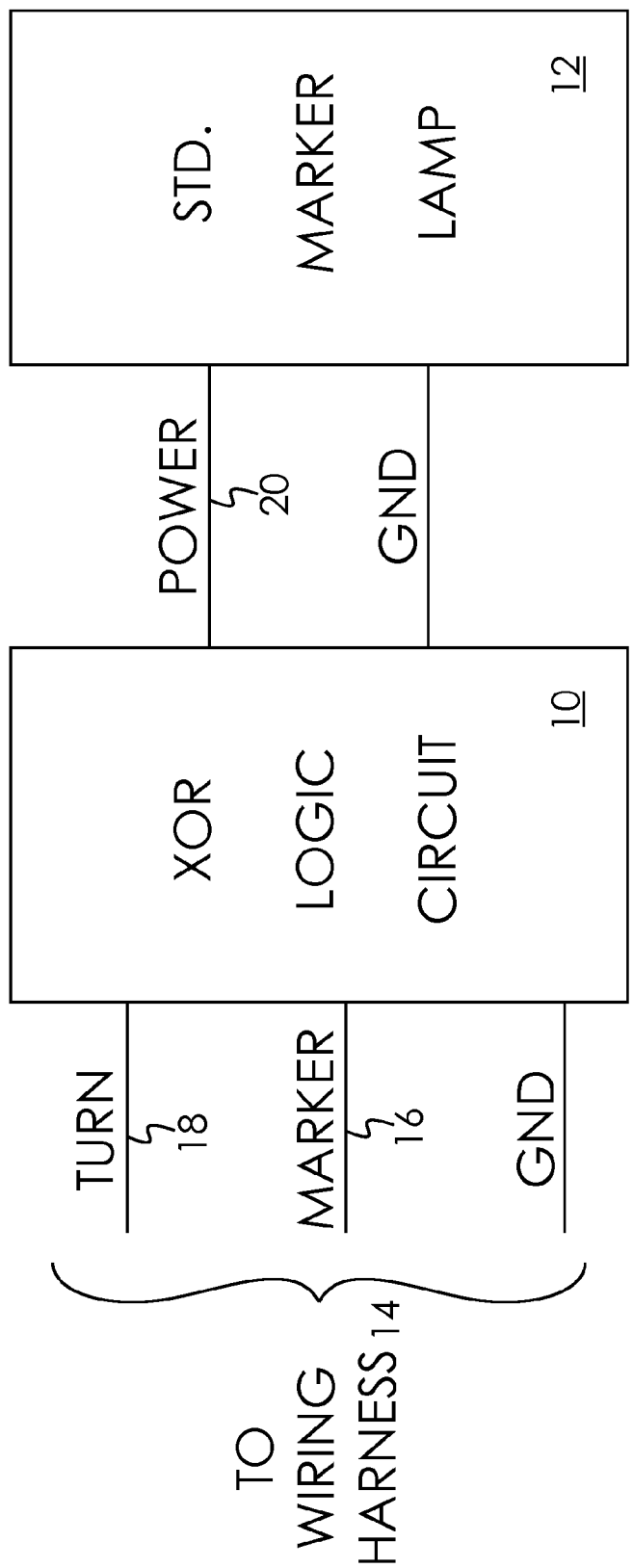
FIG. 1 is a schematic block diagram illustrating one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

An exclusive OR (XOR) logic circuit provides a voltage to its output if any one of the inputs receives a voltage. If the inputs to the XOR circuit are all high or all low, there is no output. In one embodiment, single intensity marker lamps that the trailer designer wishes to flash can be connected to a lamp driver employing an exclusive OR (XOR) circuit as disclosed herein. Using this driver, all of the marker lamps in a row can be of the same style, but one lamp can be flashed in the row of marker lamps. In some embodiments, if all of the marker lamps are on, the lamp being driven by the XOR driver circuit will flash out of sequence with the turn signal flash. If all of the marker lamps are off, the lamp being driven by the XOR driver circuit will flash in sequence with the turn signal flash.

If an XOR logic circuit 10 is placed between a standard single intensity marker lamp 12 and the vehicular wiring harness 14 that drives the marker lamp 12, as shown in FIG. 1, such that the marker function wire 16 of the vehicular wiring harness 14 and the turn function wire 18 of the vehicular wiring harness 14 are both applied as inputs to the XOR logic circuit 10, the standard marker lamp 12 can be connected to the output 20 of the XOR logic circuit 10 and operate per the truth table shown in Table 1 below.

TABLE 1

XOR Logic Circuit Truth Table

| Turn Function | Marker Function | Lamp Operation |
|---|---|---|
| 0 (no voltage) | 0 (no voltage) | Off (no light) |
| 0 (no voltage) | 1 (voltage) | On (light) |
| 1 (voltage) | 0 (no voltage) | On (light) |
| 1 (voltage) | 1 (voltage) | Off (no light) |

When neither the marker function wire 16 nor turn function wire 18 is active (i.e., no operating voltage is present on either wire) the lamp 12 is off. When both the marker function wire 16 and turn function wire 18 are active (i.e., an operating voltage is present on both wires), the lamp 12 is off. If either (but not both) of the marker function wire 16 or turn function wire 18 are active (i.e., an operating voltage is present on one but not both of the wires), the lamp 12 is on.

To describe the operation another way, if the marker function wire 16 is off, the lamp 12 will flash in sequence with the other lamps flashing on the trailer. If the marker function wire 16 is on, the lamp 12 will flash out of sequence with the other lamps flashing on the trailer.

The XOR logic circuit 10 may be located in any convenient location, inside a lamp or outside the lamp.

Figure 2:
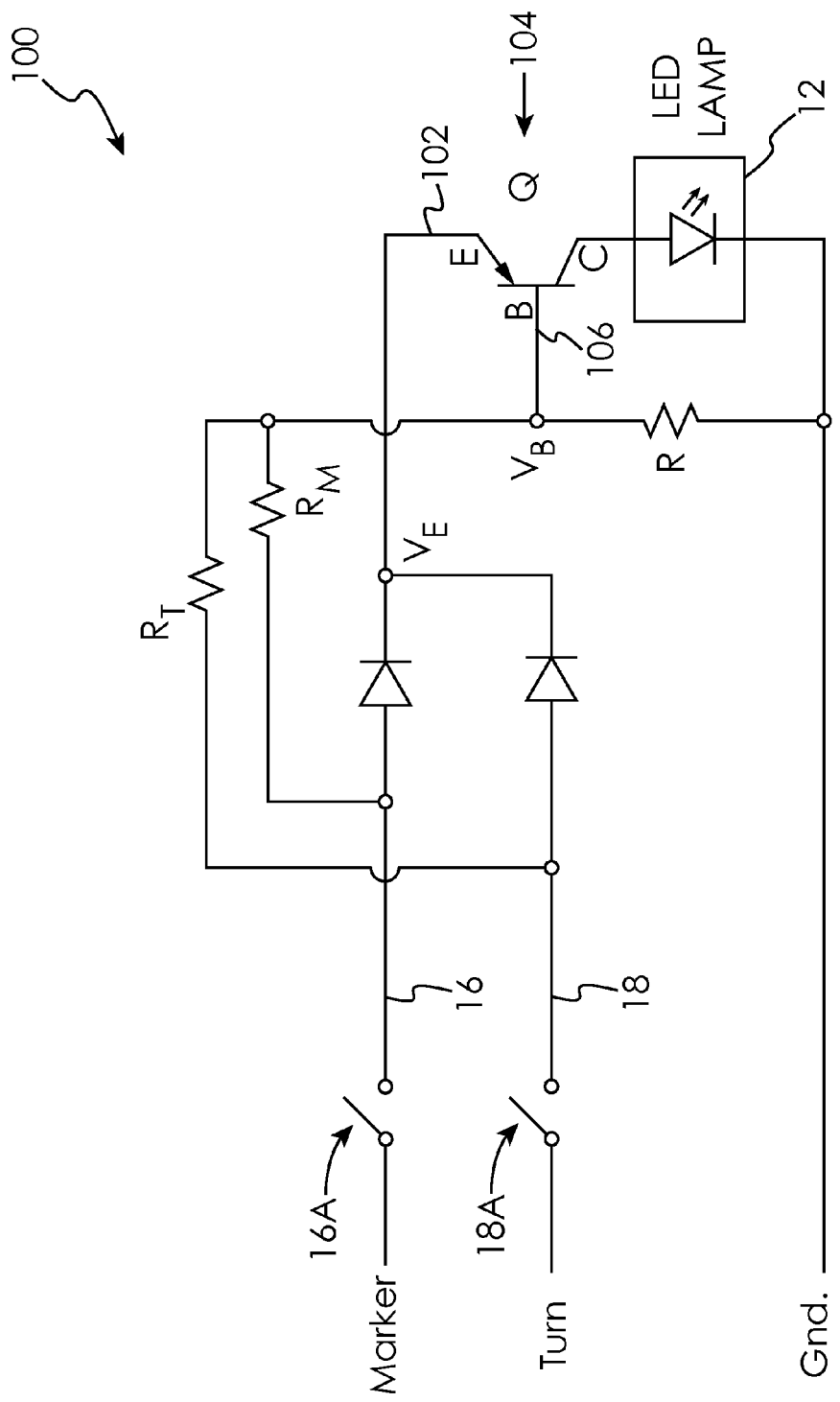
FIG. 2 is a schematic electrical circuit diagram illustrating one embodiment of the present disclosure.

FIG. 2 illustrates a schematic electrical circuit diagram of an XOR logic circuit 100 of one embodiment of the present disclosure. The circuit in FIG. 2 operates as follows. When both marker function wire 16 and turn function wire 18 are open (i.e. switches 16A and 18A are open and no operating voltage is present), there is no voltage to the circuit 100. No voltage is available to power the lamp 12 and it is off. If either switch 16A or 18A is closed, there is a voltage present at the emitter 102 of the transistor 104. There is also a voltage at the base 106 of the transistor 104 that is equivalent to the voltage divider RT or RM, and R. If the transistor 104 is a PNP bipolar transistor, the resistances must be selected so that the voltage at the base 106 of the transistor 104 is more than 0.6V lower than the voltage at the emitter 102. This assures that the transistor 104 is turned on, and that current flows through and turns on the lamp 12. With this design, if either of the marker function wire 16 or turn function wire 18 supplies an appropriate level of voltage, the lamp 12 will turn on. If both the marker function wire 16 and turn function wire 18 are on (i.e., supply an appropriate level of voltage), there is still voltage to the emitter 102 of the transistor 104. However, now the voltage at the base 106 is set by the voltage divider from the parallel connection of RT and RM and R as shown. If the resistors RT and RM are selected correctly, the base 106 of the transistor 104 will be less than 0.6V lower than the emitter 102 and the transistor 104 will not be turned on. With this design, if both of the marker function wire 16 and turn function wire 18 supply an appropriate level of voltage, the transistor 104 will be off and the lamp 12 will not light. Note that transistor 104 can be any type of switching device that has a switching control input that is operative to selectively conductively couple a power input terminal to an output terminal, such as a metal oxide semiconductor field effect transistor (MOSFET), or other type of transistor or switching device, and the resistances selected so that the switching control input voltage will turn on and off at the proper inputs.

Figure 3:
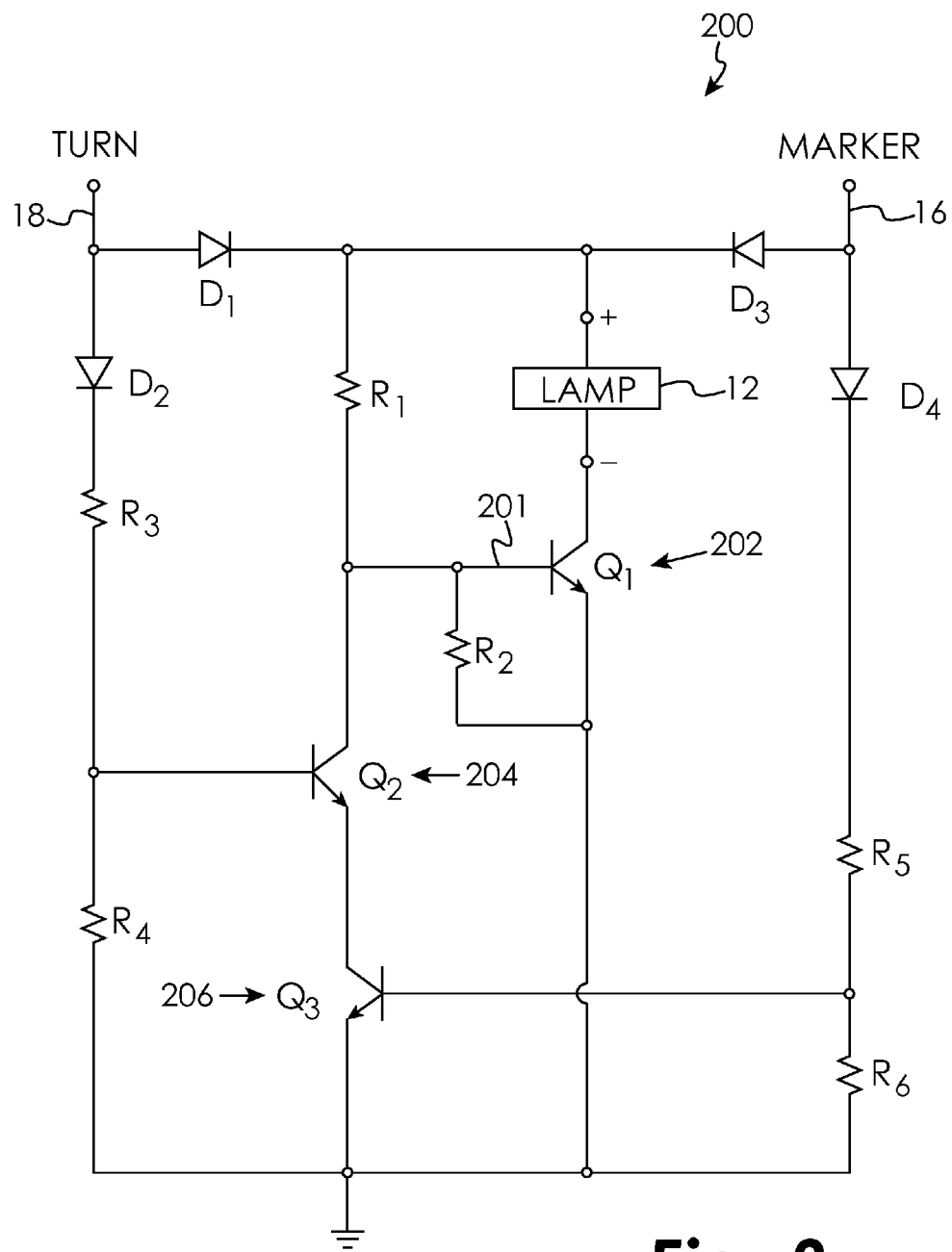
FIG. 3 is a schematic electrical circuit diagram illustrating one embodiment of the present disclosure.

FIG. 3 illustrates a schematic electrical circuit diagram of an XOR logic circuit 200 of another embodiment of the present disclosure. FIG. 3 operates as follows. If neither marker function wire 16 nor turn function wire 18 are on, there is no power to the circuit and the lamp 12 is off. If there is voltage applied to either or both the marker function wire 16 or turn function wire 18, there is power applied to the lamp 12 and to the base 201 of transistor 202 via one or both rectifier diodes. There are two transistors, 204 and 206, connected in series to the base 201 of transistor 202 as shown. If there is power applied to only one input 16 or 18, only one of the transistors 204 and 206 are on, the other transistor is off and transistor 202 remains on (since its base 201 is not grounded through the transistors 204 and 206, one of which is off). When transistor 202 remains on and there is power to the lamp 12, the lamp 12 will be illuminated. If power is applied to both inputs 16 and 18, both of the transistors 204 and 206 will be on. Since transistors 204 and 206 are connected in series to ground, when both transistors 204 and 206 are on, the voltage at the base 201 of transistor 202 will be less than 0.6V and transistor 202 is off. If transistor 202 is off, no current can flow through the lamp 12 and the lamp 12 will be turned off. It will be appreciated by those skilled in the art that in the embodiments of both FIGS. 2 and 3, the lamp 12 may be placed on either side of the controlling switching device 104, 202 (i.e., high side control or low side control). It shall be further understood that resistor R2 as shown in FIG. 3 may be optionally omitted, depending on the needs of the particular application. Table 2 below describes the behavior of the circuit of FIG. 3.

TABLE 2

XOR Logic Circuit Truth Table for FIG. 3

| Turn Function 18 | Marker Function 16 | Q1 | Q2 | Q3 | Lamp Operation |
|---|---|---|---|---|---|
| 0 (no voltage) | 0 (no voltage) | Off | Off | Off | Off (no light) |
| 0 (no voltage) | 1 (voltage) | On | Off | On | On (light) |
| 1 (voltage) | 0 (no voltage) | On | On | Off | On (light) |
| 1 (voltage) | 1 (voltage) | Off | On | On | Off (no light) |

Figure 4:
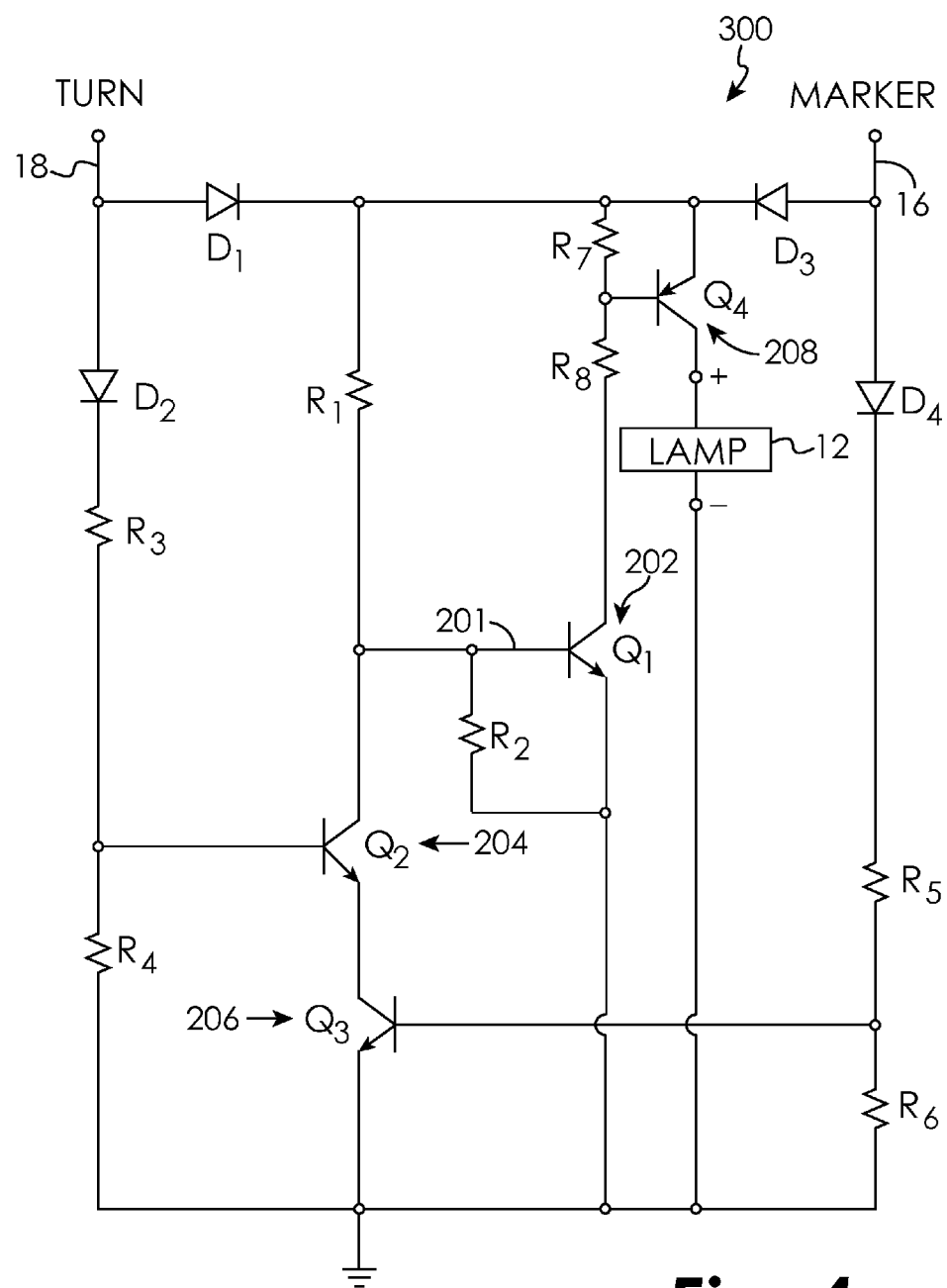
FIG. 4 is a schematic electrical circuit diagram illustrating one embodiment of the present disclosure.

FIG. 4 illustrates a schematic electrical circuit diagram of an XOR logic circuit 300 of another embodiment of the present disclosure which is similar to the embodiment of FIG. 3, except that an additional transistor 208 has been added in order to facilitate switching the lamp 12 from the positive terminal, as opposed to the negative terminal. This configuration simplifies the installation wiring of the lamp in some cases, especially where the XOR circuit 300 is located in a housing or harness remote from the lamp 12. For example, a single harness wire (from the collector of transistor 208) can be run to the positive terminal of the lamp, and the negative terminal of lamp can be connected to any convenient ground near the installed lamp, such as a nearby existing harness ground, an adjacent lamp ground, or even the vehicle chassis. FIG. 4 operates as follows. Instead of transistor 202 (shown here as an NPN transistor) directly switching the power path of the lamp 12, transistor 202 instead switches the base current path of transistor 208 (shown here as a PNP transistor), via the voltage divider made up of R7 and R8. Therefore when transistor 202 is on, transistor 208 will also be on. The lamp 12 is connected between the collector of transistor 208 and ground as shown. When transistor 208 is on, the lamp will be illuminated. When transistor 208 is off, the lamp 12 will be off. The truth table for FIG. 4 including transistor 208 is shown below.

TABLE 3

XOR Logic Circuit Truth Table for FIG. 4

| Turn Function 18 | Marker Function 16 | Q1 | Q2 | Q3 | Q4 | Lamp Operation |
| --- | --- | --- | --- | --- | --- | --- |
| 0 (no voltage) | 0 (no voltage) | Off | Off | Off | Off | Off (no light) |
| 0 (no voltage) | 1 (voltage) | On | Off | On | On | On (light) |
| 1 (voltage) | 0 (no voltage) | On | On | Off | On | On (light) |
| 1 (voltage) | 1 (voltage) | Off | On | On | Off | Off (no light) |

Figure 5:
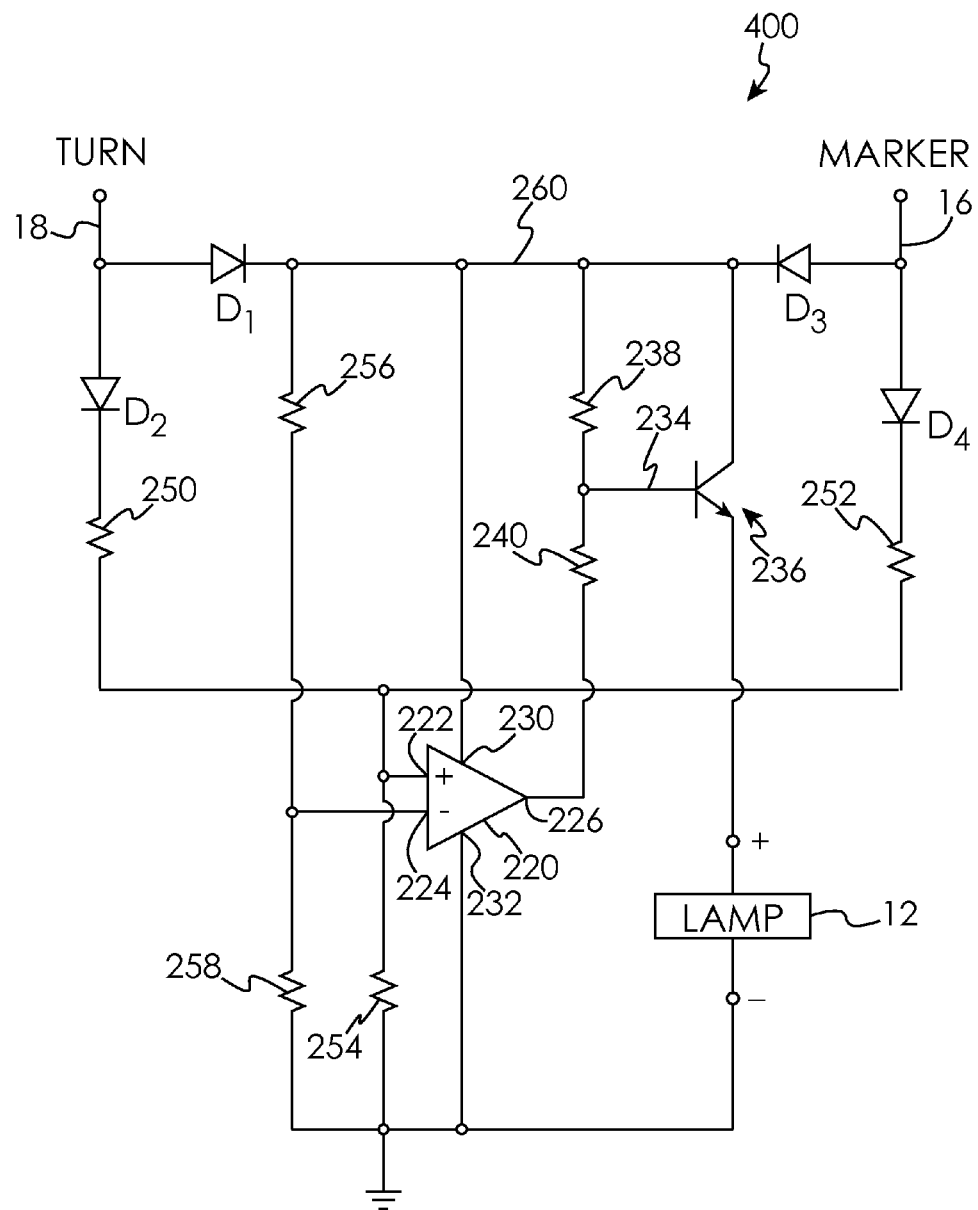
FIG. 5 is a schematic electrical circuit diagram illustrating one embodiment of the present disclosure.

FIG. 5 illustrates a schematic electrical circuit diagram of an XOR logic circuit 400 of another embodiment of the present disclosure which incorporates a comparator 220 to eliminate certain transistors from the circuit. As one nonlimiting example, the comparator may comprise an LM339 comparator supplied by ST Microelectronics. As shown, comparator 220 includes a non-inverting input 222, an inverting input 224, and an output 226. Comparator 220 may also include a power supply input 230 and a ground 232. If the resistors FIG. 5 operates as follows. If neither marker function input 16 nor turn function input 18 are on, there is no power to the circuit and the lamp 12 is off. If there is voltage applied to either or both the marker function input 16 or turn function input 18, there is power applied to the base 234 of transistor 236 via one or both rectifier diodes D1,D3 and resistor 238. The output 226 of comparator 220 is connected to the base 234 of transistor 236 via resistor 240. If the resistors 250, 252, 254, 256, and 258 are chosen properly, the output 226 of the comparator 220 can be made to be on (sink current from resistor 240 to ground) when power is applied to only one of the inputs 16 or 18, and be off (isolate resistor 240 from ground) when both inputs 16 and 18 are on at the same time. For example, assume resistors 250, 252, 256 and 258 are chosen to be 10 kilohm each and resistor 254 is chosen to be 7 kilohm. Then, with typical vehicle voltages seen at node 260 (approx 10-16 volt vehicle battery supply, accounting for drop across diodes D1,D3), the voltage at the non-inverting input 222 will be slightly less than that of the inverting input 224 if only one of the two inputs 16 or 18 is on, and the voltage at the non-inverting input 222 will be slightly more than that of the non-inverting input 222 when both of the two signals 16 and 18 is on. If 10 volts is taken as the voltage at node 260, and given the above resistor values, then when only one of the inputs 16 or 18 is on, the voltage at the non-inverting input 222 will be approximately 4.1 volts, and the voltage at the 224 inverting input will be approximately 5 volts. Therefore, the output 226 of the comparator will be off. If both signals 16 and 18 are on, the voltage at the non-inverting input 222 will be approximately 5.8 volts, with the voltage at the inverting input 224 still at 5 volts. Therefore, the output 226 of the comparator will be on. Based on this behavior, the comparator 222 drives the transistor 236 (and by extension, lamp 12) in an XOR fashion relative to the marker and turn signals 16 and 18 as shown in Table 4 below.

TABLE 4

XOR Logic Circuit Truth Table for FIG. 5

| Turn Function 18 | Marker Function 16 | Q1 | Comparator Output | Lamp Operation |
| --- | --- | --- | --- | --- |
| 0 (no voltage) | 0 (no voltage) | Off | Off | Off (no light) |
| 0 (no voltage) | 1 (voltage) | On | On | On (light) |
| 1 (voltage) | 0 (no voltage) | On | On | On (light) |
| 1 (voltage) | 1 (voltage) | Off | Off | Off (no light) |

Figure 6:
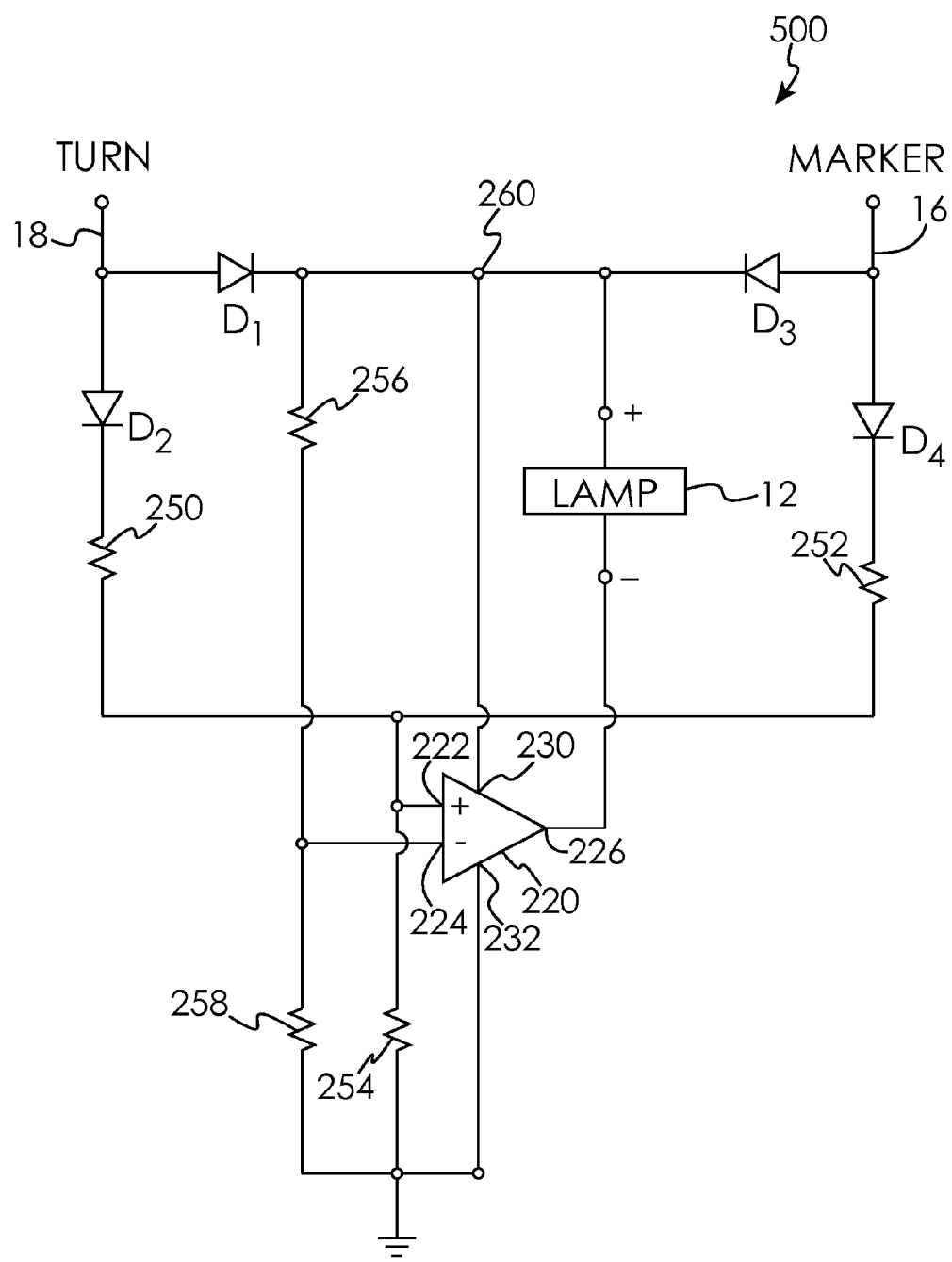
FIG. 6 is a schematic electrical circuit diagram illustrating one embodiment of the present disclosure.

FIG. 6 illustrates a schematic electrical circuit diagram of an XOR logic circuit 500 of another embodiment of the present disclosure which is similar to circuit 400, but uses the comparator 220 to drive the lamp 12 directly, without the need for the transistor 236. As shown, the positive terminal of the lamp 12 is connected to node 260, and the negative terminal of the lamp 12 is connected to the comparator output 226. If the same resistor values are used as in FIG. 4, the comparator 220 will drive the lamp 12 in an XOR fashion with respect to the marker and turn inputs 16 and 18. When the comparator output 226 is on (only one of the marker or turn inputs 16 or 18 is on), the lamp 12 will be illuminated. When the comparator output is off (none or both of the marker and turn inputs 16 and 18 are on), the lamp 12 will be off. Table 5 below describes the behavior of the circuit.

TABLE 5

XOR Logic Circuit Truth Table for FIG. 6

| Turn Function 18 | Marker Function 16 | Comparator Output | Lamp Operation |
| --- | --- | --- | --- |
| 0 (no voltage) | 0 (no voltage) | Off | Off (no light) |
| 0 (no voltage) | 1 (voltage) | On | On (light) |
| 1 (voltage) | 0 (no voltage) | On | On (light) |
| 1 (voltage) | 1 (voltage) | Off | Off (no light) |

By using the presently disclosed lamp driver embodiments, trailer manufacturers can use standard single intensity marker lamps in auxiliary lamp locations and combine the flash and marker functions in one lamp, increasing conspicuity and lowering their overall costs.

It shall be understood that the disclosed lamp driver circuits may be optionally incorporated into a common housing with a vehicle lamp, or optionally provided in a separate housing remote from the lamp housing. It shall be further understood that the disclosed lamp driver circuits may be optionally incorporated into a molded plug, to which a lamp may be connected, as described in U.S. patent application Ser. No. 13/331,146, although other mounting and enclosing arrangements are contemplated to be within the scope of the present disclosure.

As used here, the term "operatively coupled" means connected such that current can flow between two devices. In addition, two devices having an optional resistor connecting them are considered to be operatively coupled.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle lamp driver, comprising:
   a logic circuit operative to implement an exclusive OR (XOR) logic function between its inputs and its output, the logic circuit comprising:
      a marker function input;
      a turn function input;
      a ground input;
      a lamp driver output; and
      a first switching device having a first power input operatively coupled to said marker and turn function inputs, a first power output operatively coupled to said lamp driver output, and a first control input;
   wherein the first switching device is operable to interrupt current flow from said first power input to said first power output when only one of the marker function input and turn function input is activated; and
   wherein the first switching device is operable to interrupt current flow from said first power input to said first power output when only one of the marker function input and turn function input is activated.

2. The vehicle lamp driver of claim 1,
   wherein the logic circuit further comprises a ground output; and
   wherein the first switching device is operable to interrupt a current path between the lamp driver output and the ground output.

3. The lamp driver of claim 2, wherein said first switching device is a transistor.

4. The lamp driver of claim 3, wherein said first switching device is a PNP transistor, said first control input is a base of the PNP transistor, said first power input is an emitter of the PNP transistor, and said first power output is a collector of the PNP transistor.

5. The vehicle lamp driver of claim 4, wherein the logic circuit further comprises:
   a second switching device having a second power input, a second power output, and a second control input, said second power input and said second power output operatively coupled in series with said first control input;
   a third switching device having a third power input, a third power output, and a third control input, said third control input operatively coupled in series with said marker function input and said ground input; and
   a fourth switching device having a fourth power input, a fourth power output, and a fourth control input, said fourth control input operatively coupled in series between said turn function input and said ground input;
   wherein said second control input is operatively coupled in series with said third power input, said third power output, said fourth power input and said fourth power output in a current path between a first node, said first node connecting said turn and marker inputs and said ground input.

6. The lamp driver of claim 5, wherein the second switching device is operable to interrupt a current path to the first control input.

7. The lamp driver of claim 6, wherein said second switching device is a transistor.

8. The lamp driver of claim 7, wherein said second switching device is a NPN transistor, said second control input is a base of the NPN transistor, said second power input is a collector of the NPN transistor, and said second power output is an emitter of the NPN transistor.

9. The lamp driver of claim 8, wherein said third and fourth switching devices are operatively coupled in series with said second control input and are operable to interrupt a current path through the second control input.

10. The lamp driver of claim 1, wherein said first switching device is a PNP transistor, said first control input is a base of the PNP transistor, said first power input is an emitter of the PNP transistor, and said first power output is a collector of the PNP transistor.

11. The vehicle lamp driver of claim 1, wherein the logic circuit further comprises:
    a second switching device having a second power input, a second power output, and a second control input, said second power input and said second power output operatively coupled in series with said first control input;
    a third switching device having a third power input, a third power output, and a third control input, said third control input operatively coupled in series with said marker function input and said ground input; and
    a fourth switching device having a fourth power input, a fourth power output, and a fourth control input, said fourth control input operatively coupled in series between said turn function input and said ground input;
    wherein said second control input is operatively coupled in series with said third power input, said third power output, said fourth power input and said fourth power output in a current path between a first, said first node connecting said turn and marker inputs and said ground input.

12. The lamp driver of claim 11, wherein the second switching device is operable to interrupt a current path through the first control input.

13. The lamp driver of claim 11, wherein said second switching device is a transistor.

14. The lamp driver of claim 13, wherein said second switching device is an NPN transistor, said second control input is a base of the NPN transistor, said second power input is a collector of the NPN transistor, and said second power output is an emitter of the NPN transistor.

15. The lamp driver of claim 1, wherein said third and fourth switching devices are operatively coupled in series with said second control input and are operable to interrupt a current path through the second control input.

16. A vehicle lamp driver, comprising:
    a logic circuit operative to implement an exclusive OR (XOR) logic function between its inputs and its output, the logic circuit comprising:
       a marker function input;
       a turn function input;
       a ground input;
       a lamp driver output;
       a first switching device having a first power input operatively coupled to said marker and turn function inputs, a first power output operatively coupled to said lamp driver output, and a first control input; and
       a comparator device having second and third control inputs, a second power input, and a second power output
       wherein said comparator device is configured to interrupt a current path through said first control input and said second power input and output depending on the state of said second and third control inputs.

17. The vehicle lamp driver of claim 16,
    wherein said comparator is configured to allow current flow through said first control input if only one of said marker and turn function inputs are activated; and
    wherein said comparator is configured to interrupt current flow through said first control input if both of said marker and turn function inputs are activated.

18. The vehicle lamp driver of claim 16, wherein a first resistor is operatively coupled between said turn input and said second control input, a second resistor is operatively coupled between said marker input and said second control input, and a third resistor is operatively coupled between said second control input and said ground input.

19. The vehicle lamp driver of claim 18, wherein a fourth resistor is operatively coupled between a first node and said third control input and a fifth resistor is operatively coupled between said third control input and said ground input, said first node connecting said turn and marker inputs.

20. The vehicle lamp driver of claim 19,
wherein said resistors are selected such said second control input has a lower voltage than said third control input when only one of said turn and marker signals are activated; and
wherein said resistors are selected such said second control input has a higher voltage than said third control input when both of said turn and marker signals are activated.

21. A vehicle lamp driver, comprising:
a logic circuit operative to implement an exclusive OR (XOR) logic function between its inputs and its output, the logic circuit comprising:
a marker function input;
a turn function input;
a ground input;
a lamp driver output operatively coupled to said turn and marker inputs;
a lamp ground output; and
a comparator device having first and second control inputs, a second power input, and a second power output;
wherein said comparator device is configured to interrupt a current path through said lamp depending on the state of said first and second control inputs.

22. The vehicle lamp driver of claim 21,
wherein said comparator is configured to allow current flow from said lamp ground output to said ground input when only one of said marker and turn function inputs are activated; and
wherein said comparator is configured to interrupt current flow from said lamp ground output to said ground input when both of said marker and turn function inputs are activated.

23. The vehicle lamp driver of claim 22, wherein a first resistor is operatively coupled between said turn input and said first control input, a second resistor is operatively coupled between said marker input and said first control input, and a third resistor is operatively coupled between said first control input and said ground input.

24. The vehicle lamp driver of claim 23, wherein a fourth resistor is operatively coupled between a first node and said second control input and a fifth resistor is operatively coupled between said first control input and said ground input, said first node connecting said turn and marker inputs.

25. The vehicle lamp driver of claim 24,
wherein said resistors are selected such said first control input has a lower voltage than said second control input when only one of said turn and marker signals are activated; and
wherein said resistors are selected such said first control input has a higher voltage than said second control input when both of said turn and marker signals are activated.

26. A vehicle lamp assembly, comprising:
a housing;
at least one lamp located within the housing and having a lamp power input; and
a lamp driver located within the housing, the lamp driver comprising:
a logic circuit operative to implement an exclusive OR (XOR) logic function between its inputs and its output, the logic circuit comprising:
a marker function input;
a turn function input;
a ground input;
a lamp driver output operatively coupled to said lamp power input;
a first switching device having a first power input operatively coupled to said marker and turn function inputs, a first power output operatively coupled to said lamp driver output, and a first control input;
wherein the first switching device is operable to interrupt current flow from said first power input to said first power output when only one of the marker function input and turn function input is activated; and
wherein the first switching device is operable to interrupt current flow from said first power input to said first power output when only one of the marker function input and turn function input is activated.

27. A vehicle lamp assembly, comprising:
a housing;
at least one lamp located within the housing and having a lamp power input; and
a lamp driver located within the housing, the lamp driver comprising:
a logic circuit operative to implement an exclusive OR (XOR) logic function between its inputs and its output, the logic circuit comprising:
a marker function input;
a turn function input;
a ground input;
a lamp driver output operatively coupled to said lamp power input;
a first switching device having a first power input operatively coupled to said marker and turn function inputs, a first power output operatively coupled to said lamp driver output, and a first control input;
a comparator device having second and third control inputs, a second power input, and a second power output
wherein said comparator device is configured to interrupt a current path through said first control input and said second power input and output depending on the state of said second and third control inputs.

28. A vehicle lamp assembly, comprising:
a housing;
at least one lamp located within the housing and having a lamp power input and a lamp ground input;
a lamp driver located within the housing, the lamp driver comprising:
a logic circuit operative to implement an exclusive OR (XOR) logic function between its inputs and its output, the logic circuit comprising:
a marker function input;
a turn function input;
a ground input;
a lamp driver output operatively coupled to said turn and marker inputs;
a lamp ground output operatively coupled to said lamp ground input; and
a comparator device having first and second control inputs, a second power input, and a second power output;

wherein said comparator device is configured to interrupt a current path through said lamp depending on the state of said first and second control inputs.

* * * * *